United States Patent
Rachamadugu

(10) Patent No.: US 9,076,311 B2
(45) Date of Patent: Jul. 7, 2015

(54) METHOD AND APPARATUS FOR PROVIDING REMOTE WORKFLOW MANAGEMENT

(75) Inventor: Sreenivas Rachamadugu, Leesburg, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1502 days.

(21) Appl. No.: 11/617,314

(22) Filed: Dec. 28, 2006

(65) Prior Publication Data
US 2007/0127667 A1     Jun. 7, 2007

Related U.S. Application Data

(63) Continuation-in-part of application No. 11/368,750, filed on Mar. 6, 2006.

(60) Provisional application No. 60/714,674, filed on Sep. 7, 2005.

(51) Int. Cl.
*G06F 15/16* (2006.01)
*G08B 13/196* (2006.01)
(Continued)

(52) U.S. Cl.
CPC .... *G08B 13/19613* (2013.01); *G06F 17/30017* (2013.01); *G11B 27/032* (2013.01);
(Continued)

(58) Field of Classification Search
CPC ............. G08B 13/19613; H04N 7/173; H04N 21/854; G11B 27/3027; G11B 27/034; G11B 27/11; G11B 27/105; G11B 27/107; G06F 17/30017

USPC .......... 709/203, 207, 223, 226, 227; 379/201; 380/269

See application file for complete search history.

(56) References Cited

U.S. PATENT DOCUMENTS

| | | |
|---|---|---|
| 5,303,367 A | 4/1994 | Leenstra et al. |
| 5,313,630 A | 5/1994 | Namioka et al. |

(Continued)

FOREIGN PATENT DOCUMENTS

| | | |
|---|---|---|
| EP | 0764951 | 3/1997 |
| EP | 1463058 | 9/2004 |

(Continued)

OTHER PUBLICATIONS

"Advanced Systems Format (ASF) Specification," Microsoft Corporation, Revision Jan. 20, 2002, http://download.microsoft.com/download/E/0/6/E06DB390-1E2A-4978-82BB-311810D8A28D/ASF_Specification.doc, 104 pages, Jun. 2004.

(Continued)

*Primary Examiner* — Thuong Nguyen

(57) ABSTRACT

An approach is provided for remote workflow management. The workflow repository, management and monitoring is performed from a remote facility while the resources that are required to execute the workflow may be in a completely different network. The resources of a subscriber network are identified. The identified resources are registered within a repository, wherein the repository is maintained by a service provider. The repository is configured to store rules for allocating the identified resources according to the defined business process flow. The allocated resources are applied to a workflow.

14 Claims, 7 Drawing Sheets

(51) Int. Cl.

| | |
|---|---|
| G06F 17/30 | (2006.01) |
| G11B 27/032 | (2006.01) |
| G11B 27/034 | (2006.01) |
| G11B 27/10 | (2006.01) |
| G11B 27/11 | (2006.01) |
| G11B 27/30 | (2006.01) |
| H04N 7/173 | (2011.01) |
| H04N 21/854 | (2011.01) |

(52) U.S. Cl.
CPC ............ *G11B27/034* (2013.01); *G11B 27/105* (2013.01); *G11B 27/107* (2013.01); *G11B 27/11* (2013.01); *G11B 27/3027* (2013.01); *H04N 7/173* (2013.01); *H04N 21/854* (2013.01)

(56) References Cited

U.S. PATENT DOCUMENTS

| | | |
|---|---|---|
| 5,499,371 A | 3/1996 | Henninger et al. |
| 5,557,790 A | 9/1996 | Bingham et al. |
| 5,611,076 A | 3/1997 | Durflinger et al. |
| 5,612,715 A | 3/1997 | Karaki et al. |
| 5,729,730 A | 3/1998 | Wlaschin et al. |
| 5,790,176 A | 8/1998 | Craig |
| 5,799,310 A | 8/1998 | Anderson et al. |
| 5,831,669 A | 11/1998 | Adrain |
| 5,845,073 A | 12/1998 | Carlin et al. |
| 5,852,435 A | 12/1998 | Vigneaux et al. |
| 5,864,870 A | 1/1999 | Guck |
| 5,892,900 A | 4/1999 | Ginter et al. |
| 5,930,446 A | 7/1999 | Kanda |
| 5,956,424 A | 9/1999 | Wootton et al. |
| 5,980,044 A | 11/1999 | Cannon et al. |
| 6,026,408 A | 2/2000 | Srinivasan et al. |
| 6,047,291 A | 4/2000 | Anderson et al. |
| 6,069,627 A | 5/2000 | Conrad et al. |
| 6,092,154 A | 7/2000 | Curtis et al. |
| 6,151,622 A | 11/2000 | Fraekel et al. |
| 6,211,869 B1 | 4/2001 | Loveman et al. |
| 6,222,549 B1 | 4/2001 | Hoddie |
| 6,226,038 B1 | 5/2001 | Frink et al. |
| 6,226,618 B1 | 5/2001 | Downs et al. |
| 6,246,803 B1 | 6/2001 | Gauch |
| 6,263,313 B1 | 7/2001 | Milsted et al. |
| 6,330,572 B1 | 12/2001 | Sitka |
| 6,404,446 B1 | 6/2002 | Bates et al. |
| 6,405,198 B1 | 6/2002 | Bitar et al. |
| 6,411,770 B1 | 6/2002 | Ito et al. |
| 6,519,571 B1 | 2/2003 | Guheen et al. |
| 6,522,418 B2 | 2/2003 | Yokomizo et al. |
| 6,573,907 B1 | 6/2003 | Madrane |
| 6,643,659 B1 | 11/2003 | MacIssac et al. |
| 6,658,568 B1 | 12/2003 | Ginter et al. |
| 6,678,002 B2 | 1/2004 | Frink et al. |
| 6,698,020 B1 | 2/2004 | Zigmond et al. |
| 6,714,594 B2 | 3/2004 | Dimitrova et al. |
| 6,721,490 B1 | 4/2004 | Yao et al. |
| 6,728,727 B2 | 4/2004 | Komine et al. |
| 6,732,183 B1 | 5/2004 | Graham |
| 6,795,506 B1 | 9/2004 | Zhang et al. |
| 6,865,540 B1 | 3/2005 | Faber et al. |
| 6,870,887 B2 | 3/2005 | Kauffman et al. |
| 6,917,979 B1* | 7/2005 | Dutra et al. .................. 709/229 |
| 6,934,339 B2 | 8/2005 | Kato |
| 6,947,959 B1 | 9/2005 | Gill |
| 6,961,445 B1 | 11/2005 | Jensen et al. |
| 6,970,510 B1 | 11/2005 | Wee et al. |
| 7,168,086 B1 | 1/2007 | Carpenter et al. |
| 7,177,520 B2 | 2/2007 | Zetts |
| 7,310,111 B2 | 12/2007 | Ramirez-Diaz et al. |
| 7,409,144 B2 | 8/2008 | McGrath et al. |
| 7,505,604 B2 | 3/2009 | Zakrzewski et al. |
| 7,522,163 B2 | 4/2009 | Holmes |
| 7,577,959 B2* | 8/2009 | Nguyen et al. .................. 718/105 |
| 7,629,995 B2 | 12/2009 | Salivar et al. |
| 7,650,625 B2 | 1/2010 | Watkins |
| 7,676,820 B2 | 3/2010 | Snijder et al. |
| 7,782,365 B2 | 8/2010 | Levien et al. |
| 7,783,154 B2 | 8/2010 | Wilkins et al. |
| 7,902,978 B2 | 3/2011 | Pederson |
| 7,952,609 B2 | 5/2011 | Simerly et al. |
| 8,135,852 B2 | 3/2012 | Nilsson et al. |
| 2001/0034250 A1 | 10/2001 | Chadha |
| 2001/0051927 A1* | 12/2001 | London et al. .................. 705/51 |
| 2002/0035732 A1 | 3/2002 | Zetts |
| 2002/0046292 A1* | 4/2002 | Tennison et al. ............... 709/238 |
| 2002/0052771 A1* | 5/2002 | Bacon et al. ....................... 705/8 |
| 2002/0056123 A1 | 5/2002 | Liwerant et al. |
| 2002/0069218 A1 | 6/2002 | Sull et al. |
| 2002/0108115 A1 | 8/2002 | Palmer |
| 2002/0122659 A1 | 9/2002 | McGrath et al. |
| 2002/0145622 A1 | 10/2002 | Kauffman et al. |
| 2002/0194253 A1 | 12/2002 | Cooper et al. |
| 2003/0001885 A1 | 1/2003 | Lin et al. |
| 2003/0005034 A1* | 1/2003 | Amin ............................ 709/202 |
| 2003/0018978 A1 | 1/2003 | Singal et al. |
| 2003/0025599 A1 | 2/2003 | Monroe |
| 2003/0044162 A1 | 3/2003 | Angel |
| 2003/0084451 A1 | 5/2003 | Pierzga et al. |
| 2003/0088877 A1 | 5/2003 | Loveman et al. |
| 2003/0135464 A1 | 7/2003 | Mourad et al. |
| 2003/0188019 A1* | 10/2003 | Wesley ......................... 709/245 |
| 2003/0229900 A1 | 12/2003 | Reisman |
| 2004/0017471 A1 | 1/2004 | Suga et al. |
| 2004/0059996 A1 | 3/2004 | Fasciano |
| 2004/0098754 A1 | 5/2004 | Vella et al. |
| 2004/0131330 A1 | 7/2004 | Wilkins et al. |
| 2004/0133467 A1 | 7/2004 | Siler |
| 2004/0136590 A1 | 7/2004 | Brouwer |
| 2004/0153504 A1 | 8/2004 | Hutchinson et al. |
| 2004/0168184 A1* | 8/2004 | Steenkamp et al. ............. 725/31 |
| 2004/0210823 A1 | 10/2004 | Miura et al. |
| 2004/0216173 A1 | 10/2004 | Horoszowski et al. |
| 2004/0223606 A1 | 11/2004 | Enete et al. |
| 2004/0247284 A1 | 12/2004 | Yamasaki |
| 2004/0255329 A1 | 12/2004 | Compton et al. |
| 2004/0268222 A1 | 12/2004 | Kawa et al. |
| 2004/0268224 A1 | 12/2004 | Balkus et al. |
| 2005/0005000 A1 | 1/2005 | Yoshimoto |
| 2005/0019005 A1 | 1/2005 | Kim et al. |
| 2005/0049886 A1 | 3/2005 | Grannan et al. |
| 2005/0073585 A1 | 4/2005 | Ettinger et al. |
| 2005/0074100 A1 | 4/2005 | Lederman |
| 2005/0091311 A1 | 4/2005 | Lund et al. |
| 2005/0149940 A1* | 7/2005 | Calinescu et al. ............. 718/104 |
| 2005/0185634 A1 | 8/2005 | Benco et al. |
| 2005/0195823 A1 | 9/2005 | Chen et al. |
| 2005/0198125 A1* | 9/2005 | Macleod Beck et al. ...... 709/204 |
| 2005/0210520 A1* | 9/2005 | Horvitz et al. .................. 725/89 |
| 2005/0262535 A1 | 11/2005 | Uchida et al. |
| 2005/0262542 A1 | 11/2005 | DeWeese et al. |
| 2005/0278425 A1 | 12/2005 | Wilsher et al. |
| 2006/0047749 A1 | 3/2006 | Davis et al. |
| 2006/0056732 A1 | 3/2006 | Holmes |
| 2006/0143686 A1* | 6/2006 | Maes .............................. 726/1 |
| 2006/0146184 A1 | 7/2006 | Gillard et al. |
| 2006/0156219 A1 | 7/2006 | Haot et al. |
| 2006/0161635 A1 | 7/2006 | Lamkin et al. |
| 2006/0205362 A1 | 9/2006 | Chang et al. |
| 2006/0236221 A1 | 10/2006 | McCausland et al. |
| 2006/0259589 A1* | 11/2006 | Lerman et al. ................. 709/219 |
| 2006/0263039 A1 | 11/2006 | Chiang |
| 2006/0274828 A1 | 12/2006 | Siemens et al. |
| 2007/0006177 A1* | 1/2007 | Aiber et al. .................... 717/136 |
| 2007/0022404 A1* | 1/2007 | Zhang et al. ................... 717/103 |
| 2007/0043860 A1* | 2/2007 | Pabari ............................ 709/224 |
| 2007/0043875 A1 | 2/2007 | Brannon |
| 2007/0113184 A1 | 5/2007 | Haot et al. |

(56) References Cited

U.S. PATENT DOCUMENTS

2008/0043106 A1     2/2008    Hassapis
2008/0320599 A1    12/2008    Raley et al.

FOREIGN PATENT DOCUMENTS

| | | |
|---|---|---|
| EP | 1864229 | 12/2007 |
| JP | 2000-341635 | 12/2000 |
| JP | 2001-346164 | 12/2001 |
| JP | 2004-088384 | 3/2004 |
| JP | 2004-320667 | 11/2004 |
| WO | WO-97/15018 | 4/1997 |
| WO | WO-97/39411 | 10/1997 |
| WO | WO-00/29980 | 5/2000 |
| WO | WO-02/01384 | 1/2002 |
| WO | WO-2005/027068 | 3/2005 |

OTHER PUBLICATIONS

"Avipreview Frequently Asked Questions", p.p. 1-7, Retrieved from the internet: URL:http://www.avipreview.com/faq.htm [retrieved Jan. 21, 2009], Oct. 15, 2002.

Bolle, et al., "Video Libraries: From Ingest to Distribution," IBM T. J. Watson Research Center, Lecture Notes in Computer Science vol. 1614, pp. 15-18, DOI:10.1007/3-540-48762-X_2, Dec. 1999.

David, "News Technology: The Cutting Edge," Appears in Capturing the Action: Changes in Newsgathering Technology, IEEE Colloquium, pp. 4/1-4/8, Oct. 27, 1995.

Gordon-Till, "My Opinion Is, Opinions Are Useful," Information World Review, Issue 184, four pages, Oct. 2002.

\* cited by examiner

METHOD AND APPARATUS FOR PROVIDING REMOTE WORKFLOW MANAGEMENT

RELATED APPLICATIONS

This application is a continuation-in-part of U.S. patent application (Ser. No. 11/368,750), filed Mar. 6, 2006, entitled "Method and System for Providing Distributed Editing and Storage of Digital Media over a Network," which claims the benefit of the earlier filing date under 35 U.S.C. §119(e) of U.S. Provisional Patent Application (Ser. No. 60/714,674), filed Sep. 7, 2005, entitled "Method and System for Supporting Media Services"; the entireties of which are incorporated herein by reference.

BACKGROUND INFORMATION

Automation of organizational activities poses a tremendous challenge in that routine tasks associated with a particular service or product involve complex interactions between technology resources and human resources. Although communications technologies have assisted with increasing productivity, such technologies, traditionally, have been deployed in an ad hoc manner, resulting in inefficiencies with respect to resource utilization. Therefore, workflow management systems have been deployed. However, these workflow systems constitute a significant investment above other infrastructure costs. This problem is heightened for the media or broadcast industry, which traditionally has been confined to technologies that are expensive and inflexible with respect to editing, production and delivery of media (e.g., video).

Based on the foregoing, there is a clear need for approaches that enable efficient management of resources.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and software for providing remote workflow management are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various embodiments are described with respect to a hosted or managed service with respect to video processing applications, it is contemplated that these embodiments have applicability to standalone systems and other processes requiring automation.

Figure 1:
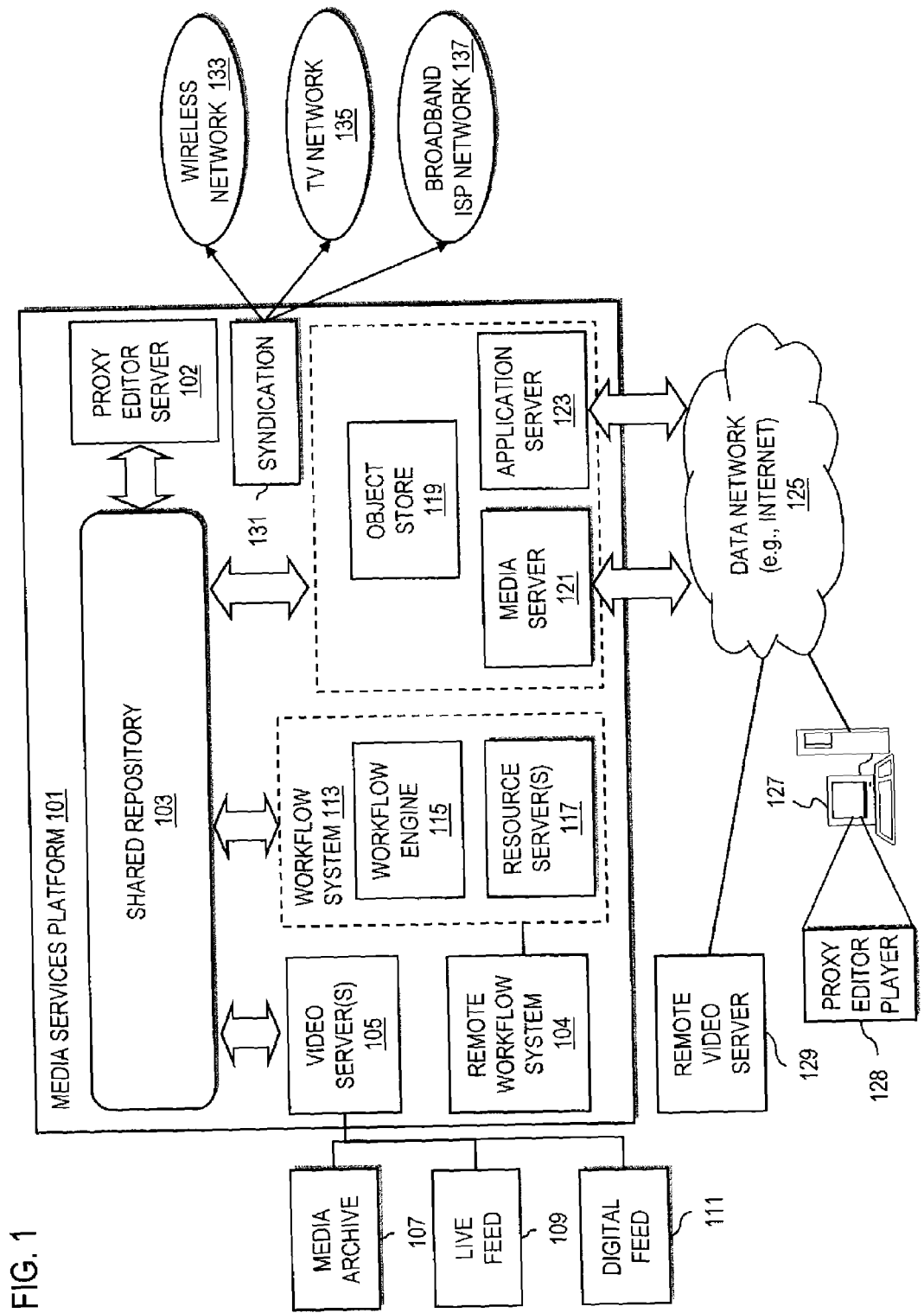
FIG. 1 is a diagram of a media services platform including a remote workflow system, according to an exemplary embodiment.

FIG. 1 is a diagram of a media services platform including a remote workflow system, according to an exemplary embodiment. For the purposes of illustration, various exemplary embodiments are described in the context of media asset management. The media services platform 101 provides an integrated media asset management platform with a fully modular architecture that enables users (e.g., customers, subscribers, etc.) to deploy the platform on a module-by-module basis as well as workflow-by-workflow. Media asset management functions include archiving, mastering of long-form content for video-on-demand (VOD) distribution, digital content aggregation and distribution. The platform 101 also supports remote proxy editing using a proxy editing application as executed by a proxy editor server 102, thereby permitting fast-turnaround broadcast productions. The editing application utilizes low-resolution version of the video content for the purposes of editing; hence, the editing application is referred to as a "proxy editor." To support the above features and functions, the media services platform 101 enables multichannel distribution of digital content to any variety and number of devices and networks—e.g., wireless mobile devices, broadband, Internet Protocol Television (IPTV), and traditional TV platforms—thereby, reducing costs and increasing revenue over conventional systems. The architecture of the media services platform 101, according to an exemplary embodiment, supports compact to enterprise-scale deployments, and ensures that storage and processing capabilities are robust and scalable, suitable for mission-critical broadcast operations.

It is recognized that there is an increasing need for professional, cost-effective editing of video feeds, such as television coverage of news or entertainment events, wherein the edited files can be provided over different alternative networks. For example, a user of a video enabled mobile cellular telephone might subscribe to a service that provides highlights of selected sporting events. Similarly, a user might subscribe to a sports headlines service, and receive files on a computer connected to a public data network, such as the global Internet. The real time delivery of events such as sports footage, interviews and edited highlights presents problems in such contexts, where it is necessary to produce compressed files to reduce the bandwidth for transmission over a cellular telephone network or a data network. Video files for such purposes need to be produced in an encoded format using, for instance, Group of Picture (GOP) technology, otherwise the raw digital stream would render timely transmissions and file storage impractical.

Thus, a video stream is created to include a sequence of sets of frames (i.e., GOP). By way of example, each group, typically 8 to 24 frames long, has only one complete frame represented in full. This complete frame is compressed using only intraframe compression, and thus is denoted as an I frame. Other frames are utilized and include temporally-compressed frames, representing only change data with respect to the complete frame. Specifically, during encoding, motion prediction techniques compare neighboring frames and pinpoint areas of movement, defining vectors for how each will move from one frame to the next. By recording only these vectors, the data which needs to be recorded can be substantially reduced. Predictive (P) frames refer to the previous frame, while Bi-directional (B) frames rely on previous and subsequent frames. This combination of compression techniques is highly effective in reducing the size of the video stream.

With GOP systems, an index is required to decode a given frame. Conventionally, the index is only written at the end of the file once the file has completed the encoding process. As a result, no index is available until the recording is completed. The implication is that the production of an edited version of the file, for example to transmit as highlights over a cellular phone network, cannot commence until the recording is completed and this index file produced. The media services platform 101 addresses this drawback by creating a separate index file, which can be supplemental to the routinely generated index file, during the recording and encoding process.

Accordingly, the platform 101, in an exemplary embodiment, can provide remote editing over any data network (e.g., Internet Protocol (IP)-based) that can support connectivity to the proxy editor server 102, whereby editing can commence without having to wait for completion of the recording. The proxy editor application resident on the server 102 enables developers to build professional-level desktop video editing applications using, for example, the Microsoft Windows Media Series platform.

The platform 101 also provides significant scalability due to decoupled storage. Conventional editing systems required direct disk access to the video file. This poses a severe scalability issue, as every editing function (e.g., play, scrub, etc.) from the editing client creates disk traffic. If the storage cannot timely respond, a conventional editing application often freezes or crashes, such a scenario is unacceptable for real time feeds. With the media services platform 101, the content is downloaded once on each client cache; thus, the centralized storage requirements are reduced by a very significant factor (depending on editing type).

As seen in FIG. 1, the media services platform 101 utilizes a shared repository 103 that stores media (e.g., digitized video) content ingested from one or more video servers 105. Ingesting involves obtaining content into the media services platform 101, and can be accomplished locally or from a remote location. In an exemplary embodiment, the repository 103 is deployed as a shared storage system—e.g., including storage area network (SAN) and network attached storage (NAS)—which has the capability for high-performance video ingest and playback. The shared SAN 103 can utilize scalable Fibre Channel switch fabric to interface with a Fibre Channel disk array and nearline tape libraries. The shared repository 103 can be implemented as a combination of SANs and NAS devices.

Figure 2:
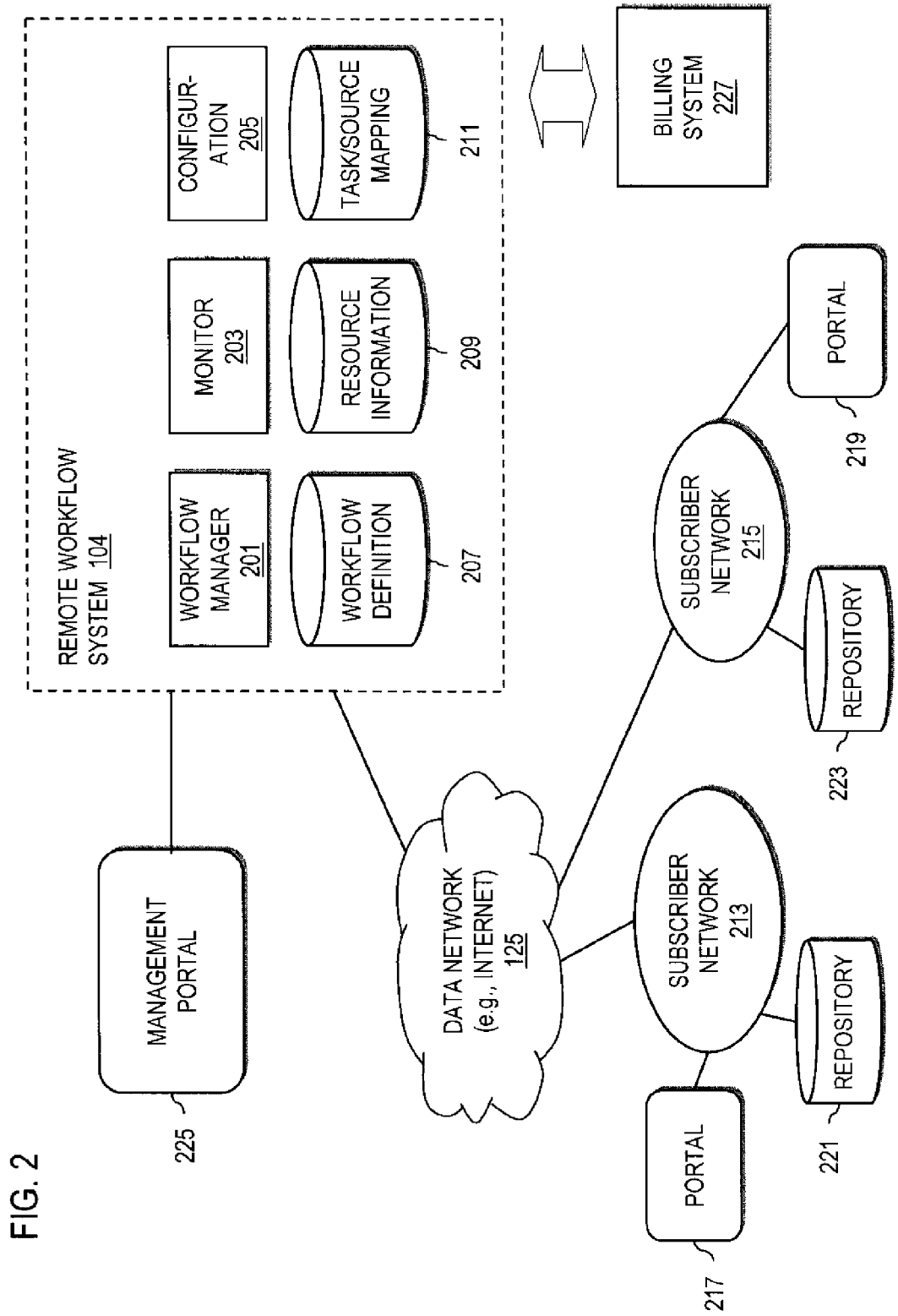
FIG. 2 is a diagram of a remote workflow system, according to an exemplary embodiment.

In addition, the platform 101 includes a remote workflow system 104 that provides a hosted or managed workflow service, thereby permitting subscribers to manage the resources of their respective networks in an integrated and automated fashion, without incurring the cost of deploying such a system themselves. The components of this remote workflow system 104, in one embodiment, are illustrated in FIG. 2. The operation of this system 104 are detailed with respect to FIGS. 3-5.

Figure 7:
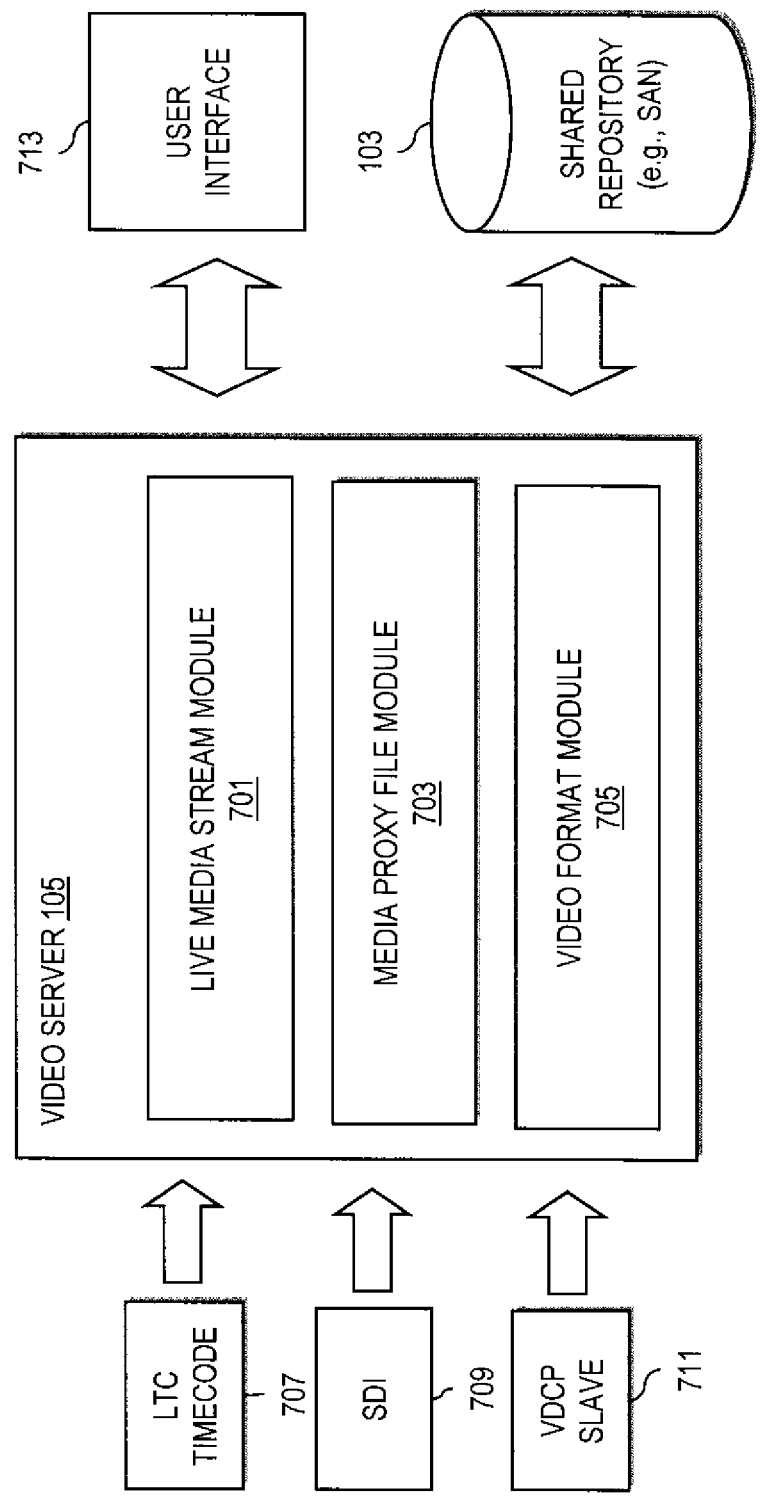
FIG. 7 is a function diagram of a video server in the system of FIG. 1, according to an exemplary embodiment.

The video servers 105, as will be more fully described in FIG. 7, can interface any type of content sources, such as a media archive 107, a live feed 109, or a digital feed 111.

The media services platform 101 includes a workflow system 113, which comprises a workflow engine 115 and one or more resource servers 117 to support editing and distribution of digital media. The automated workflow provides the ability to automate and orchestrate repetitive workflows. In particular, the workflow system 113 offers users an overview of their work and associated events; that is, the system 113 supports an application that shows the status and progress of each job and links to relevant applications that enable the users to perform their tasks and advance the project towards completion. The workflow engine 115 controls workflow jobs and dispatches them to the resource servers 117. Communication among the resource servers 117 is facilitated by, for example, Microsoft Message Queuing.

In addition to providing individual users a central point for managing their work, the workflow system 113 is also useful as a monitoring system. For example, the system 113 can support a graphical user interface (GUI) on the user side, such that users can quickly determine through visual indicators whether tasks have been completed or error conditions exist. The users (e.g., administrators) can "drill down" to view more detail. Also, jobs can be paused, restarted (from any stage), aborted and deleted from the workflow application. This capability provides users with full control over the priority of the jobs. Additionally, the system 113 can record timing information for every step of a task, thereby enabling generation of reports on delivery turnaround etc.—e.g., for Service Level Agreement (SLA) reporting.

According to an exemplary embodiment, the media services platform 101 can be implemented with a pre-configured, standard set of common workflows. For instance, these workflows can support generic delivery of files, rendering of edits and delivery of content from the video server 105. Moreover, customizable workflows are supported, wherein the users can integrate new services.

As shown, the media services platform 101 comprises core servers, such as an object store 119, a media server 121, and an application server 123. In an exemplary embodiment, the object store 119 contains configuration information for the workflow system 113. Configuration information include, in an exemplary embodiment, parameters of every service, the capabilities of every resource server 117, the definition of workflows, and the real time status of every job. The object store 119 supports the various applications that interface with it through an object store Application Program Interface (API). According to an exemplary embodiment, the object store 119 has an object-based database schema (e.g., Microsoft SQL (Structured Query Language) Server, for example. The media server 121 receives stream broadcasts and serves the stream on to individual user workstations using, for example, Microsoft Windows Media. The stream contains, for example, Society of Motion Picture and Television Engineers (SMPTE) timecode, enabling the stream to be used as a frame-accurate source for live logging.

The application server 123 provides dynamic web site creation and administration functions, such as a search engine, and database capabilities. In an exemplary embodiment, the application server 123 executes Microsoft Internet Information Server (IIS), and can be configured for high availability and load-balancing based on industry standard components.

The media server 121 and the application server 123 interface with the data network 125, which can be a corporate network or the Internet. The application server 123 is thus accessible by a workstation 127, which can be any type of computing device—e.g., laptop, web appliance, palm computer, personal digital assistant (PDA), etc. The workstation 127 can utilize a browser (e.g., web-based), generally, to communicate with the media services platform 101, and a downloadable applet (e.g., ActiveX controls) to support distributed video editing functionality. The browser in conjunction with the applet is referred to an editing (or editor) interface—e.g., the proxy editor player 128. The workstation 127 can also be equipped with voiceover microphone and headphones to facilitate the editing process. The proxy editor player 128 communicates with the proxy editor server 102 to enable the viewing and editing of content, including live video, remotely. Editing functionalities include immediate access to frame-accurate content, even while being recorded, full audio and video scrubbing of source clips and edit timelines over the network 125, and generation of Advanced Authoring Format/Edit Decision List (AAF/EDL) files for craft edit integration.

To connect to the media services platform 101, the workstation 127 need not require special hardware or software. As mentioned, the workstation 127 need only be configured to run a browser application, e.g., Internet Explorer, for communication over the data network 125. With this user interface, changes or upgrades to the workstation 127 are not required, as all the applications are hosted centrally at the platform 101.

In addition to the video server 105 within the media services platform 101, a remote video server 129 can be deployed to ingest content for uploading to the platform 101 via the data network 125. The video servers 105, 129 include, in an exemplary embodiment, a longitudinal timecode (LTC) reader card as well as other video interfaces (e.g., RS-422 control card, Windows Media Encoder and Matrox DigiServer video card). Video editing relies on the use of timecodes to ensure precise edits, capturing all in "in points" and "out points" of the edits. An edited video can be characterized by an edit decision list (EDL), which enumerates all the edits used to produce the edited video. LTC timecodes are recorded as a longitudinal track, analogous to audio tracks. With LTC, each frame time is divided into 80 bit cells. LTC timecodes are transmitted serially in four-bit nibbles, using Manchester codes.

The video servers 105, 129 can be remotely controlled by the workstation 127. Also, these servers 105, 129 can connect to the shared SAN 103 via Fibre Channel and a file system by, e.g., ADIC™.

A syndication (or distribution) function 131 can then distribute content over various channels, such as a wireless network 133 (e.g., cellular, wireless local area network (WLAN)), a television network 135, and a broadband Internet Service Provider (ISP) network 137. Depending on the capabilities supported by the wireless or wired access network (e.g., networks 133 and 137), rich services, such as presence, events, instant messaging (IM), voice telephony, video, games and entertainment services can be supported.

Although the video server 105, the workflow engine 115, the object store 119, the media server 121, and the application server 123 are shown as separate components, it is recognized that the functions of these servers can be combined in a variety of ways within one or more physical component. For example, the object store 119, the application server 123, and the workflow engine 115 can reside within a single server; and the video server 105 and the media server 121 can be combined into a common server.

As mentioned above, the media services platform 101 enables media asset management, rapid production, and robust, cost-effective proxy editing capabilities. By way of illustration, management of media assets to support broadband video on demand (VOD) is described. One of the first tasks involved with VOD applications is ingesting full length movies into the video servers 105 for mastering and editing (e.g., removing black, stitching tapes together, adding legal notices etc). The masters are then stored on the shared SAN 103. The content is then transcoded to a high quality media stream format, such as Microsoft Windows Media Series, and delivered automatically with metadata to their broadband video pay-per-view portal (e.g., any one or more of the networks 133, 135 and 137).

Additionally, the media services platform 101 can offer video archiving services. For instance, customers can extend their online storage with nearline tape and manage content seamlessly across multiple storage devices using add-on archive modules. Online storage can be backed up and/or migrated to tape according to automated policies. Advantageously, this archival approach can be transparent to the users; that is, the users are never aware that the master video is no longer stored on expensive disk-based storage. In an embodiment, a library application can be implemented with the media services platform 101 to provide seamless integration with offline video and data tape archives. Further, the media services platform 101 provides high integration with existing production workflows through its capability to transcode and deliver any content contained in the archive to, for example, popular non-linear editors (e.g., AVID™ editor).

Furthermore, the media services platform 101 enables flexible, cost-effective content aggregation and distribution, which is suitable for content service providers. Typical workflows involve aggregation of content from owners in such formats as Motion Pictures Expert Group (MPEG)-2 or Windows Media, along with metadata in eXtensible Markup Language (XML) files, using pre-configured File Transfer Protocol (FTP) hot folders. "Hot folders" are predefined folders that trigger a workflow event (e.g., file conversion, compression, file transfer, etc.) upon movement of files into the folder. These owners can submit content directly to the workflow system 113 for automatic transcoding, Digital Rights Management (DRM) protection and syndication to multi-channel operators.

According to an exemplary embodiment, the media services platform 101 utilizes a unified user interface (e.g., web browser) for accessing applications supported by the platform 101. It is recognized that typical production and content delivery workflows often involve the use of multiple separate applications: one application for logging, a second application for encoding, a third one for editing, a fourth application for asset management, and so on. Consequently, the challenge of effectively managing workflows is difficult. The task is even more daunting in a multi-channel production and distribution environment, as greater elements need to coordinated and more applications have to be learned over traditional television environments.

The media services platform 101 advantageously simplifies this task by permitting access to the multitude of applications via a single unified user interface as part of a coherent workflow. In this manner, although various technologies are involved, the user experience is that of a single, user-friendly suite of tools, which shield non-technical users from the complex integration of applications and technologies.

The applications supported by the platform 101 include the following: media asset management and search, video editing, video server services, workflow, syndication, upload of media, library service, administration, quality assurance, copyright protection, music cue sheet services, and reporting. In addition, the users can develop their own applications within the unified user interface. Asset management permits users to manage the location of content within organized folder structures and categories. The asset search function offers a generic search capability across the entire object store 119.

The media services platform 101 also provides a flexible and cost-effective approach for proxy logging and editing of live and archive material. Such editing services can be in support of news and sport editing, archive browsing and editing, mobile, broadband and IPTV production and mastering, and promotion production. The editing application provides viewing and logging of live feeds, frame-accurate proxy logging and editing, and remote proxy editing (e.g., utilizing Windows Media Series proxy format). In addition, the editing application can support instant logging and editing while the feed is recording, as well as audio and video scrubbing. This editing application includes the following capabilities: edit timeline with effects; voiceover (while editing remotely—which is ideal for translation workflows); save edit projects with versions; generate thumbnail and metadata from within the editing user interface; and export EDL's or render finished edits ready for transcoding and delivery. With this application, a user, through an inexpensive workstation 127, can efficiently master a movie for VOD distribution, rough-cut a documentary, or create a fully-finished sports highlight video with voiceover and effects.

The media services platform 101, in an exemplary embodiment, utilizes a Windows Media Series codec, which allows high quality video (e.g., DVD-quality) to be logged and edited across the data network 125. Further, the platform 101 employs intelligent caching to ensure that the applications are as responsive as editing on a local hard drive, even over low-bandwidth connections.

The syndication application automates the creation and delivery of content and metadata to very specific standards for a range of target systems without manual intervention.

The upload application allows users to ingest digital files into the media services platform 101 and submit them to any permitted workflow. The users (with administrative responsibilities) can control which file types are allowed, which workflows are compatible, and the way in which different types of content are processed. The upload application can facilitate submission of the files to automatic workflows for hands-off end-to-end processing as well as to manual workflows that require manual intervention.

The upload application is complemented by a hot folder system, wherein workflow activities are automatically initiated upon movement of files into and out of the hot folders. The file system folders can be pre-configured to behave like the upload application and pass files of particular types to the workflows. Metadata for each asset provided in accompanying XML files can be acquired and mapped directly into the object store 119.

The reporting application enables users to create "printer-friendly" reports on any information stored in the object store 119. The reporting application is pre-configured with a number of default reports for reporting on content delivery. Users can filter each report by selecting a desired property of the data, e.g., subscription name, or start and end date. Through the API of the media services platform 101, users (and system integrators) can create new report templates and queries.

The library application offers the ability to manage physical media that contain instances of assets managed in the media services platform 101. Even with continuing expansion in the use of digital media, traditional media continue to play an important role. Typical production environments possess a number of video tapes, DVDs or other physical media for storing content and data. Some environments utilize large established archives.

In mixed media environments, it is beneficial to manage digital and physical instances of content in an integrated manner. Accordingly, the library application provides the following capabilities. For example, the application permits the user to generate and print barcodes for the physical media and shelves, with automatic naming as well as bulk naming (with configurable naming conventions). Also, barcodes are employed for common actions, thereby allowing completely keyboard-free operation for checking in/out and shelving of the physical media. The library application additionally can manage items across multiple physical locations, e.g., local and master libraries. Further, the application supports PDA-based applications with a barcode scanner for mobile checking in/out and shelving. The library application advantageously simplifies management of multiple copies of the same asset on several physical media and storage of multiple assets on the same tape or DVD. The library application can further be used in conjunction with robotic tape libraries to track tapes that have been removed and shelved.

Moreover, the media services platform 101 provides an administration function to tailor system configuration for different customers. It is recognized that a "one size fits all" configuration for all users is non-existent. That is, each user, department, organization and customer has its own set of requirements. Therefore, the media services platform 101 supports concurrent use of multiple configurations. For example, each deployment can configure to its own user groups, create new workflows, integrate new services, support new content types, and specify new output media formats. The customer can also change and add metadata structures and fields, and integrate existing web-based applications into the user interface. The above capabilities can be executed, via the administration application, with immediate effect without shutting down the platform 101. Additionally, in a multi-department deployment scenario, multiple logical instances of the media services platform 101 can be configured with their own unique configurations.

In an exemplary embodiment, the media services platform 101 can be implemented as a turn-key system within a single box—e.g., in-a-box flight case. Under this configuration, there is no need for a costly and time-consuming IT (information technology) integration undertaking to rack the components or integrate them into the customer's network. Under this arrangement, the platform 101 is be configured as a plug-and-play system, connecting to the network automatically.

FIG. 2 is a diagram of a remote workflow system, according to an exemplary embodiment. By way of example, the remote workflow system 104 includes a workflow manager 201, a monitor module 203, and configuration module 205. The workflow manager 201 has access to a workflow definition database 207. A resource information database 209 stores data about resources that are to be managed by the system 104; the monitor module 203, among other functions, tracks resources to acquire the resource information that is to be stored in the database 209. Further, a task/source mapping database 211 is maintained by the configuration module 205 to map activities of workflows to resources. Although the databases 207-211 are depicted as three separate databases, it is contemplated that they can represent a common, central repository 103, according to one embodiment.

Under this exemplary scenario, the resources are that of subscriber networks 213, 215. These networks 213, 215 provide portals 217, 219 for communicating with the remote workflow system 104 over the data network 125. Such portals 217, 219 have the capability to manage workflows for their corresponding systems. Also, each subscriber network 213, 215 includes a repository 221, 223 containing data that can be access by the system 104 as part of the managed workflow service. These repositories 221, 223 can be utilized to manage the workflows locally within the respective networks 213, 215 should network connectivity to the system 104 be disabled or otherwise unavailable. Moreover, the remote workflow system 104 can be controlled by a standalone management portal 225—e.g., users associated with the service providers. This portal 225 can serve as a central location for published transaction data from the subscriber networks 213, 215.

The managed workflow service can be a source of revenue for a service provider that maintains the system 104. As such, a billing system 227 can generate billing information based on usage of the services of the remote workflow system 104.

The operation of the remote workflow system 104 is described below with respect to FIGS. 3-5.

Figure 3:
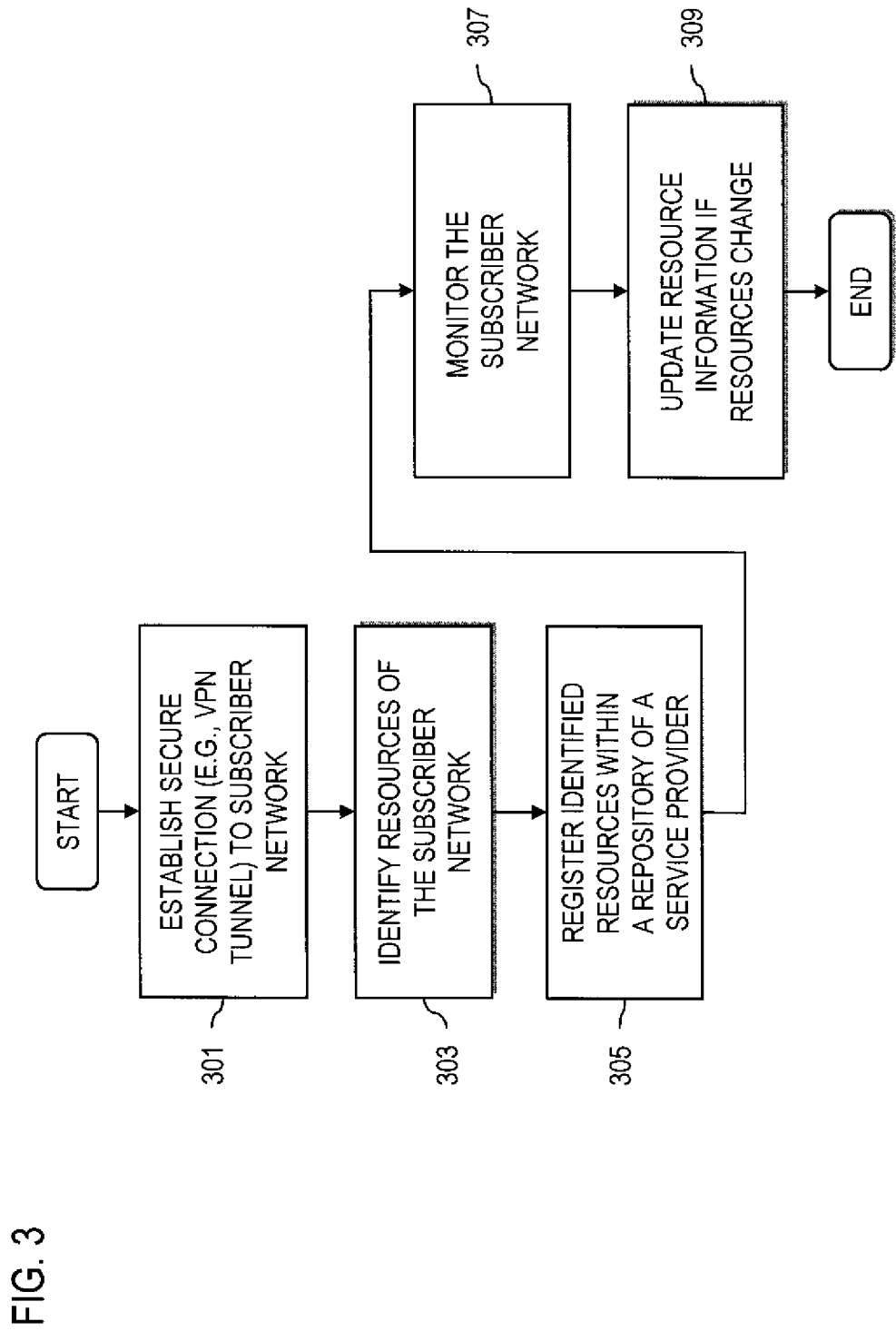
FIG. 3 is a flowchart of a process for acquiring information about resources within a subscriber network, according to an exemplary embodiment.

FIG. 3 is a flowchart of a process for acquiring information about resources within a subscriber network, according to an exemplary embodiment. In step 301, a secure connection is established between the remote workflow system 104 and the subscriber network 213, for instance. In an exemplary embodiment, the secure connection can be a Virtual Private Network (VPN) tunnel, or any encrypted connection. At this point, the monitor module 203 can identify the resources of the network 213, as in step 303. Next, the identified resources of the subscriber network 213 are registered with the resource information database 209 (per step 305). That is, information about the resources is stored; such information can include resource location, physical location, access parameters, programs (or applications), resource parameters, and availability schedules.

Thereafter, the system 104 continues to track the state of the resources of the subscriber network 213 by monitoring the network 213 for new or deleted resources, per step 307. In step 309, the resource information associated with any change is captured in the resource information database 209.

Once the remote workflow system 104 acquires knowledge of the resources of the subscriber network 213, the system 104 can manage the resources according to workflow processes, as next explained.

Figure 4:
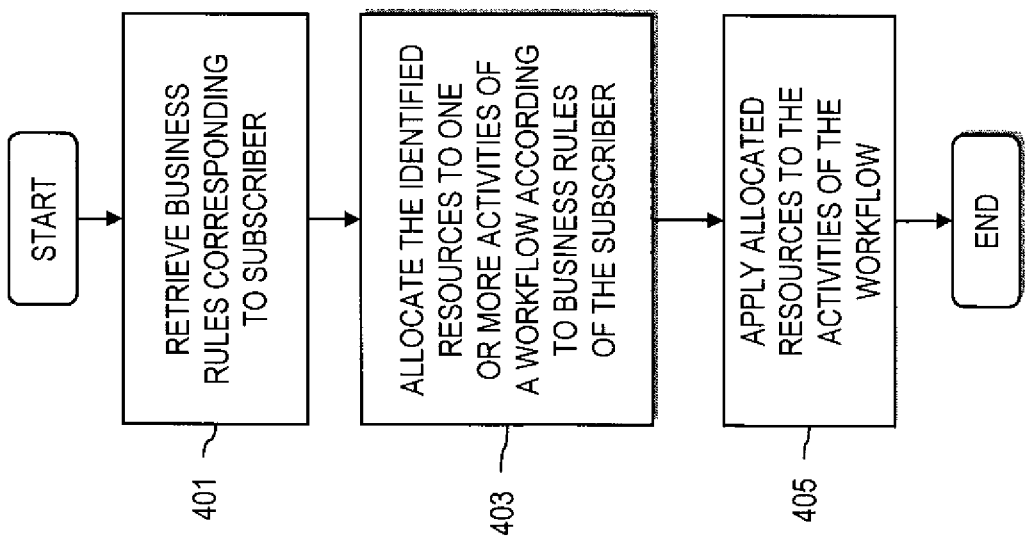
FIG. 4 is a flowchart of a process for allocating resources of the subscriber network, according to an exemplary embodiment.

FIG. 4 is a flowchart of a process for allocating resources of subscriber network, according to an exemplary embodiment. The remote workflow system 104 provides for segmenting of business rules for subscribers. In the example of FIG. 2, the subscriber networks 213, 215 would have different business rules tailored to their respective requirements. As shown, the business rules corresponding to a particular subscriber is retrieved, per step 401. Continuing with the example of FIG. 3, the subscriber is that of network 213. In step 403, the system 104 allocates the identified resources to one or more activities of the workflow according to the business rules. Subsequently, the remote workflow system 104 applies the allocated resources, as in step 405, to the workflow.

The above process can be performed for multiple subscribers using the managed system 104. The economic factors are advantageous for the service provider as well as the subscribers in that the service provider has a new source of revenue, and the subscribers can receive the benefits of an automated system without the heavy investment cost. In fact, according to one embodiment, the subscribers can utilize the features of the remote workflow system 104 on a usage basis—i.e., "pay-as-you-go" basis.

Figure 5:
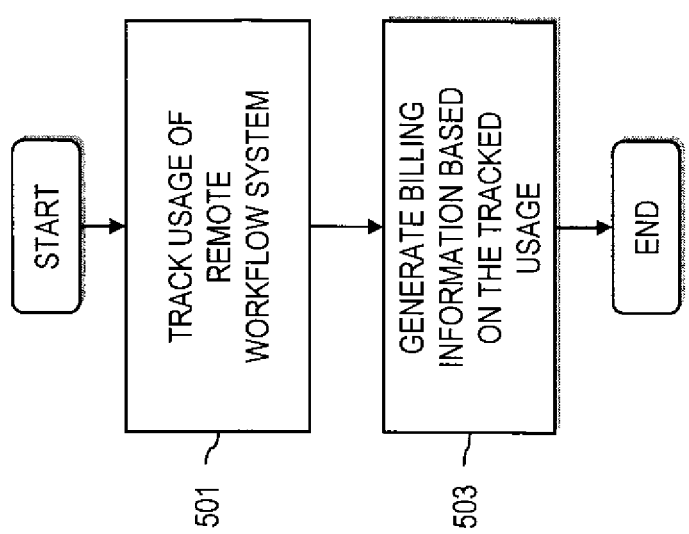
FIG. 5 is a flowchart of a process for charging for a workflow service, according to an exemplary embodiment.

FIG. 5 is a flowchart of a process for charging for a workflow service, according to an exemplary embodiment. In step 501, usage of the remote workflow system 104 is tracked either by the system 104 itself, or an external system—such as the billing system 227. Usage information is then used to generate billing information (step 503). Usage information can be any metric, such as time-based parameters, transaction-based data, etc.

According to exemplary embodiments, the processes of FIGS. 3-5 have applicability to the video processing capabilities of the platform 101. Moreover, it is recognized that these processes can be applied to any workflow activity.

Figure 6:
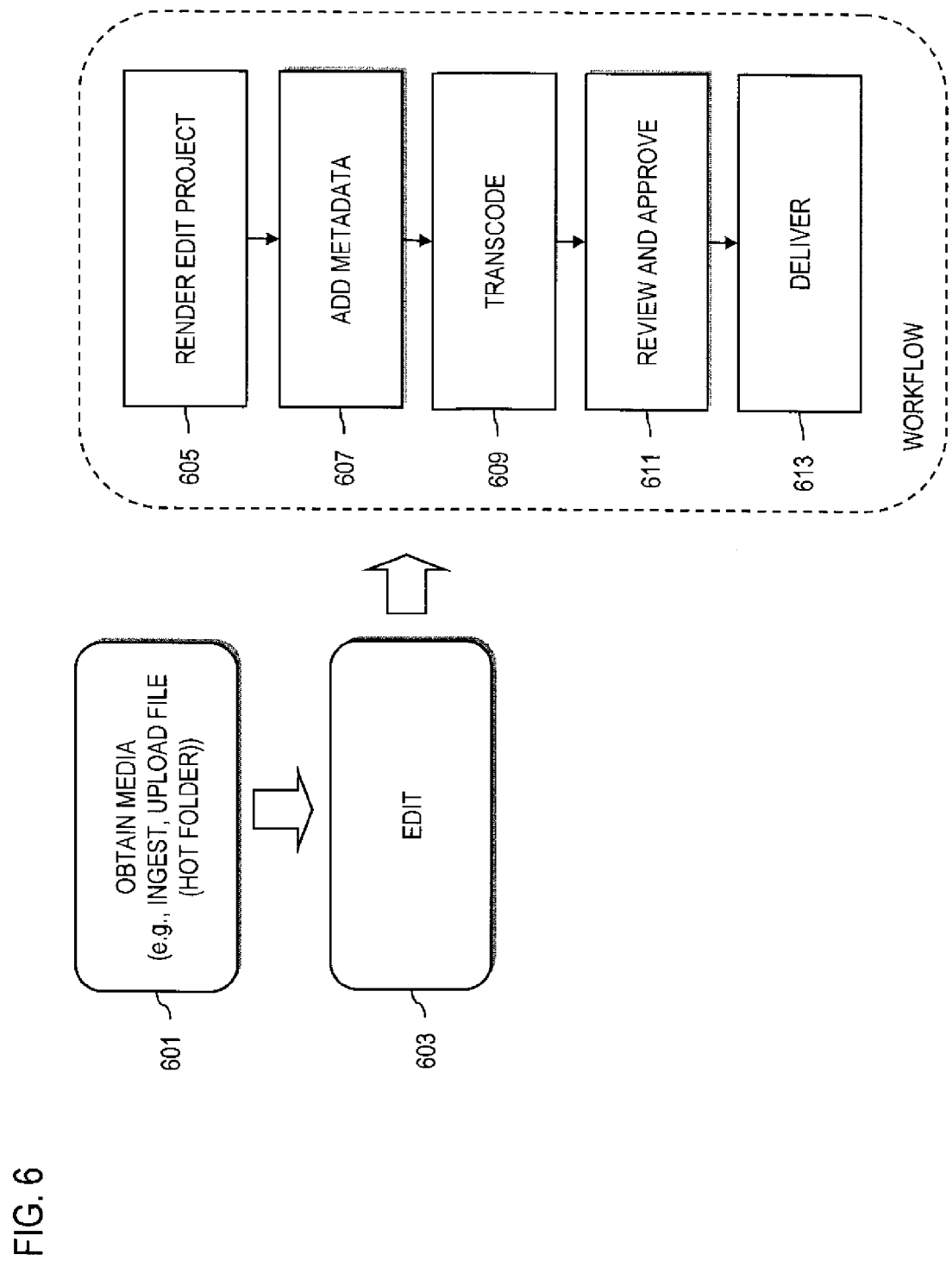
FIG. 6 is a diagram of a workflow process utilized in the system of FIG. 1 to edit digital media, according to an exemplary embodiment.

FIG. 6 is a diagram of a workflow process utilized in the system of FIG. 1 to edit digital media, according to an exemplary embodiment. For the purposes of explanation, the workflow capability of the media services platform 101 is described with respect to the video editing application. In step 601, the media that is to be edited is obtain; the media can undergo an ingest process or simply exists as a digital file that can be uploaded (using the upload application as earlier explained). Ingesting is the process of capturing content into the media services platform 101 and can occur locally or remotely with respect to the platform 101. If uploaded, the user delivers the project to selected hot folders that automatically define categorization.

The media is then edited, per step 603. By way of example, the user, utilizing the proxy editor player 128 (which is the counterpart software to the proxy editor supported by the media services platform 101) on the workstation 127, can select and log the feed (assuming a live feed which is always visible), either marking in and out points manually or using an auto-clip feature for rapid logging. The user can also insert commentary and assign a rating to the video for determining which segment of the content is the most compelling content, thereby providing an indication of the selected clips that should be edited. During or after logging, the user can select clips from the log and use the proxy editor player to trim the selection. For example, the user can jog and shuttle along a timeline, or utilize a mouse wheel to scroll frame by frame to the desired cut point. The user can then preview the selection before placing it on the edit timeline. Thereafter, the user can manipulate the clips on the timeline, reorder and trim the selections. The proxy editor player 128 can permit the user to apply zoom and crop effects to close in on areas of interest; this capability is particularly valuable for broadband or mobile outputs where detail is important. The user can record a voiceover directly onto the timeline, thereby completing the edit.

The edit is then rendered, as in step 605, as part of a workflow. In an exemplary embodiment, the edit is rendered using a high-resolution MPEG-2 master. Alternatively, an associated EDL is delivered to an integrated craft edit for completion. The media services platform 101 can support various workflows for craft editor integration, such as, store and forward, and instant editing. As for the store and forward approach, the content can be viewed, logged and edited using the proxy editor into packages for automated transcoding (from master MPEG-2) and delivery to popular non-linear editing systems (e.g., AVID Unity and AVID Media Composer, Adobe Premiere, Apple Final Cut Pro, Media 100, iFinish, Pinnacle Liquid and Vortex). With respect to instant editing, using the proxy editor player 128, the user can execute an ingest of a live feed, which can be viewed, logged and edited. The user can then export an EDL to a craft editor, which can be a third party craft editor (e.g., Incite Editor E3) that is integrated with the media services platform 101. When imported into Incite, the timeline is rebuilt frame-accurately, pointing to the MPEG-2 master on the shared SAN 103. Once the edit is complete, the craft editor creates a new MPEG-2 digital master, which is automatically re-ingested back into the platform 101 when dropped in an appropriate hot folder.

It is noted that the above process can occur while the video feeds are still being recorded, thus enabling the quickest possible turnaround of content for broadcast programs (e.g., sports and news).

In step 607, metadata is added. The file is transcoded (per step 609) and reviewed and/or approved (step 611). Thereafter, the edited filed is delivered, per step 613. The last stage in the workflow is the delivery of content files and metadata to other systems (e.g., networks 133, 135, and 137) that are responsible for delivery of content to consumers. The syndication application of the media services platform 101 provides the automated delivery of the content and metadata. The media services platform 101 operates on a "set it and forget it" principle. In other words, once a configuration is specified, no other input is required thereafter, For instance, a configuration of a new subscription is set to the required content categories, the technology used to create each file as well as the specific set of parameters are specified, and the file-naming conventions and delivery details are indicated. Every subsequent delivery from the workflow application simply implements the subscription when the correct criteria are met. Whenever the user requires a new output format, the user can specify the various configuration parameters, including the codec, frame rate, frame size, bit rate, and encoder complexity.

It is noted that any technology plugged into the workflow system 113 can be automated—e.g., for pre-processing, transcoding, DRM protection, watermarking, delivery, or any other purpose required.

The above workflow process can be illustrated in the following example involving a sports production. Under this scenario, a customer produces, on a weekly basis for instance, multiple fully-edited football match highlights every week for mobile operators (utilizing Third Generation/tJniversal Mobile Telecommunications System (3G/IMTS) technologies). The customer requires a two minute voiced highlight package be delivered to the operators within 4 minutes of the end of each game for these concurrent matches. This requirement can be achieved with the media services platform 101, whereby live broadcast feeds are recorded using the video servers 105. Producers edit and log the media using the proxy editor application (e.g., player 128) during recording of the matches. Once the matches are over, they simply select a deliver button presented by the proxy editor player 128. The workflow system 113 automatically renders the proxy edit using, for instance, a MPEG-2 50 Mbps I-frame master, before automatically transcoding the edit into the mobile formats requested by the operators and delivering the content and metadata XML to their content distribution networks. In this manner, the mobile subscribers can purchase and view the video clips on their mobile handsets within minutes of the end of each game.

According to an exemplary embodiment, the media services platform 101 can be integrated with a newsroom computer system and playout video server. The video server 105 ingests content from live feeds or tape, and journalists and producers throughout the news organization can instantly start to log and edit the live feeds from their desktop using the proxy editor player 128. Finished edits are rendered and transcoded direct from the proxy editor application to a gallery playout video server. Notification is automatically sent to the newsroom computer system and automation system when every new package is available.

FIG. 7 is a function diagram of a video server in the system of FIG. 1, according to an exemplary embodiment. As mentioned, the video server 105, among other functions, is capable of handling live broadcast video in a flexible, feature rich and cost-effective manner. In this example, the video server 105 can be slaved by a Video Disk Communications Protocol (VDCP)-compliant automation system. It is noted that the video server 105 can support both National Television System Committee (NTSC) and Phase Alternating Line (PAL) standards. The video server 105 is controllable from any user workstation (e.g., workstation 127) without geographical constraint. The video server 105 can in turn control, for instance, an attached video tape recorder (VTR) over an RS-422 interface, thereby allowing frame-accurate recording and lay back to tape, and preserving timecode through the entire process.

In an embodiment, the video server 105 includes a live media stream module 701, a media proxy file module 703, and a video format module 705. The live media stream module 701 communicates with the user interface 713 to provide logging and monitoring functions. The media proxy file module 703 supports the capability to perform editing functions during recording of the video. The video format module 705 converts a raw video stream into a standardized format—MPEG-2, for example. The modules 703 and 705 interface the repository 103 to store the ingested contents.

As shown, the server 105 can support various input sources: an LTC time code source 707, a Serial Digital Interface (SDI) source 709, and a VDCP slave source 711. The video server 105 can generate multiple outputs in real-time from the SDI source 707, in contrast to conventional video servers which generate only a single output. The modules 701, 703, 705 generate three types of outputs. One output is that of MPEG-2, in which the user can select between long-GOP and I-frame for each server, ranging from DVD-quality 5 Mbps long-GOP to 50 Mpbs I-frame only. The audio is captured at 48 kHz, for instance. The live media stream module 701 can generate a live media stream (e.g., Windows Media Series) for broadcast over a network (e.g., networks 133-137 of FIG. 1) to one or more media servers (e.g., media server 121), which serve the stream on to individual user workstations. The stream can include SMPTE timecode, thereby providing a frame-accurate source for live logging.

Finally, the media proxy file module 703 can produce a file (e.g., Windows Media proxy file) for storage in the SAN 103. The proxy editor permits this file, according to an embodiment, to be opened for viewing and editing while the file is still being written. Thus, in conjunction with the proxy editor, the video server 105 supports fast-turnaround production of live events without the need for dedicated high-bandwidth networks and expensive edit suites, and without sacrificing quality or functionality.

In addition to the robust video editing functionality, the media services platform 101 provides a collaborative environment whereby frame synchronization of proxies is maintained across multiple formats, as next explained.

The above described processes relating to allocation of storage resources may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
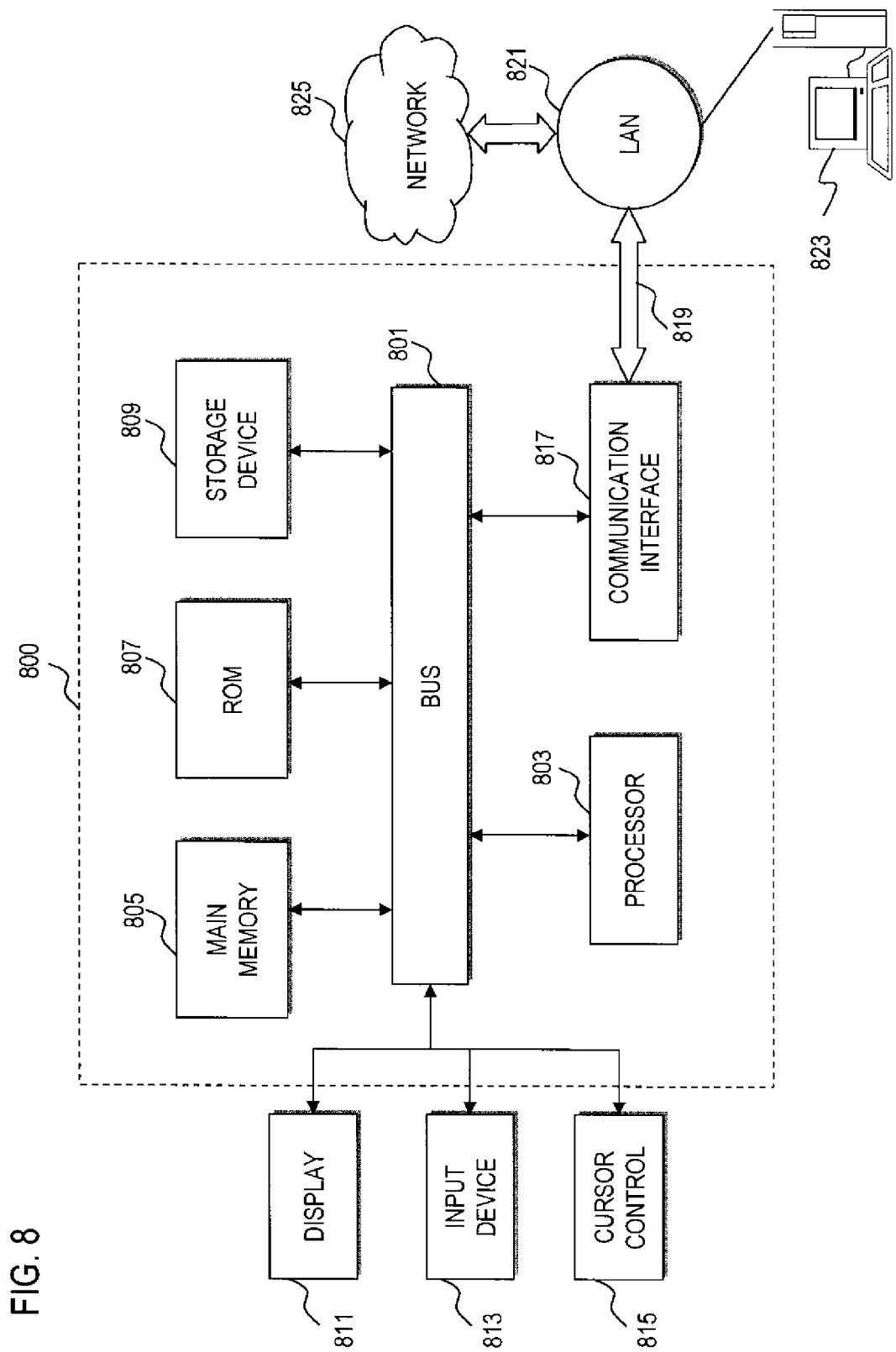
FIG. 8 is a diagram of a computer system that can be used to implement various exemplary embodiments.

FIG. 8 illustrates a computer system 800 upon which an exemplary embodiment can be implemented. For example, the processes described herein can be implemented using the computer system 800. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an exemplary embodiment, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the exemplary embodiment. Thus, exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of various embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

The following patent applications are incorporated herein by reference in their entireties: co-pending U.S. patent application Ser. No. 11/717,263 filed Dec. 29, 2006, entitled "Method and Apparatus for Synchronizing Video Frames"; co-pending U.S. patent application Ser. No. 11/617,355 filed Dec. 29, 2006, entitled "Method and Apparatus for Providing On-Demand Resource Allocation"; and co-pending U.S. patent application Ser. No. 11/617,400 filed Dec. 29, 2006, entitled "Method and System for Video Monitoring."

What is claimed is:

1. A method comprising:
identifying network resources of a remote subscriber network, wherein network resources are media, multimedia, video or digital contents;
registering the identified network resources within a repository maintained by a single service provider, wherein registering the identified network resources includes registering, for each resource, information regarding physical location, access parameters which define the accessing levels, resource parameters such as codec, frame rate, frame size, bit rate, and availability schedule;
generating a workflow definition in the repository conforming with the requirements of the registered identified network resources, wherein the workflow definition defines steps of a business process flow, and wherein the business process flow specifies activities relating to video processing including enable editing and delivering video content from a video server at the repository to authenticated subscribers;
allocating a set of business rules corresponding to the authenticated subscribers for the registered identified network resources in accordance with respective requirements of the remote subscriber network; and
applying the allocated network resources to the authenticated subscribers, corresponding to the workflow definition, of the remote subscriber network.

2. A method according to claim 1, further comprising:
establishing a secure connection to the remote subscriber network for registering the identified network resources.

3. A method according to claim 1, further comprising:
monitoring the resources; and
updating the repository based on the monitoring step.

4. A method according to claim 1, further comprising:
instructing a first one of the resources to transfer a task specified by the workflow to a second one of the resources based on the identified resources.

5. A method according to claim 1, further comprising:
defining the steps of identifying, registering and applying as a service;
tracking usage of the service; and
generating billing information based on tracked usage.

6. A method according to claim 1, wherein information of the resources includes location, access parameters, programs, resource parameters, and availability schedules.

7. A method according to claim 1, further comprising:
communicating with a portal that is configured to receive user input relating to the workflow.

8. A system comprising:
a repository maintained by a single service provider; and
a workflow system including a processor and being configured to identify one or more network resources of a remote subscriber network, wherein network resources are media, multimedia, video or digital contents, to register the identified network resources within the repository, wherein to register the identified network resources includes to register, for each resource, information regarding physical location, access parameters which define the accessing levels, resource parameters such as codec, frame rate, frame size, bit rate, and availability schedule, to generate a workflow definition in the repository conforming with the requirements of the registered identified network resources, wherein the workflow definition defines steps of a business process flow, and wherein the business process flow specifies activities relating to video processing including enable editing and delivering video content from a video server at the repository to authenticated subscribers, to allocate a set of business rules corresponding to the authenticated subscribers for the registered identified network resources in accordance with respective requirements of the remote subscriber network, and to apply the allocated network resources to the authenticated subscribers, corresponding to the workflow definition, of the remote subscriber network.

9. A system according to claim 8, wherein a secure connection is established with the remote subscriber network for registering the identified network resources.

10. A system according to claim 8, wherein the workflow system is further configured to monitor the resources, and to update the repository based on the monitoring of the resources.

11. A system according to claim 8, wherein the workflow system is further configured to instruct a first one of the resources to transfer a task specified by the workflow to a second one of the resources based on the identified resources.

12. A system according to claim 8, wherein usage of the workflow system is tracked, and billing information is generated based on tracked usage.

13. A system according to claim 8, wherein information of the resources includes location, access parameters, programs, resource parameters, and availability schedules.

14. A system according to claim 8, wherein the workflow system is further configured to communicate with a portal that is configured to receive user input relating to the workflow.

* * * * *